United States Patent
Rawnsley et al.

(10) Patent No.: US 11,007,855 B2
(45) Date of Patent: May 18, 2021

(54) END CAP FOR ROLLER TONNEAU COVER

(71) Applicant: Ford Global Technologies, LLC, Dearborn, MI (US)

(72) Inventors: Ryan Rawnsley, Pattaya (TH); Geoffrey Robert Wilson, Docklands (AU)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 16/590,442

(22) Filed: Oct. 2, 2019

(65) Prior Publication Data
US 2020/0171928 A1 Jun. 4, 2020

(30) Foreign Application Priority Data
Dec. 3, 2018 (CN) .......................... 201811463723.X (51) Int. Cl.
*B60J 7/06* (2006.01)

(52) U.S. Cl.
CPC ......... *B60J 7/067* (2013.01); *B60Y 2200/141* (2013.01)

(58) Field of Classification Search
CPC ...................................................... B60J 7/067
USPC ................................................. 296/100.1, 98
See application file for complete search history.

(56) References Cited

U.S. PATENT DOCUMENTS

| | | | |
|---|---|---|---|
| 5,040,843 A * | 8/1991 | Russell | E06B 9/58 296/98 |
| 5,761,750 A * | 6/1998 | Mazzola | E04H 4/082 4/500 |
| 9,399,391 B2 | 7/2016 | Bernardo et al. | |
| 9,931,916 B2 | 4/2018 | Ide et al. | |
| 2004/0245793 A1 | 12/2004 | Fischer | |
| 2018/0118002 A1 | 5/2018 | Koengeter et al. | |
| 2018/0134132 A1 | 5/2018 | Nania | |

FOREIGN PATENT DOCUMENTS

DE 102014205998 A1 10/2015

* cited by examiner

*Primary Examiner* — Joseph D. Pape
(74) *Attorney, Agent, or Firm* — David Coppiellie, Esq.; Carlson, Gaskey & Olds, P.C.

(57) ABSTRACT

An end cap for a roller tonneau cover of a truck includes, among other things, an end portion having a primary sliding surface and a first interlocking feature that provides an interface between the end cap and a slat of the tonneau cover, a tooth portion including teeth for engaging with a pinion gear, and a connection portion between the end portion and the tooth portion.

20 Claims, 10 Drawing Sheets

END CAP FOR ROLLER TONNEAU COVER

CROSS-REFERENCE TO RELATED APPLICATIONS

This application claims priority to CN Patent Application No. 201811463723X, which was filed on 3 Dec. 2018 and is incorporated herein by reference in its entirety.

TECHNICAL FIELD

This disclosure relates to end caps for a roller tonneau cover of a truck and, in particular, to end caps with integrated interlocking features for a roller tonneau cover of a truck.

BACKGROUND

A truck box is typically defined by lateral sidewalls, a front wall, and a rear tailgate. A tonneau cover can be used to cover the truck box. Some tonneau covers are retractable roller tonneau covers. The retractable roller tonneau covers can retract to allow for access to the truck box without fully removing the cover from the truck.

A retractable roller tonneau cover can be opened or closed automatically using a motor that moves the tonneau cover along tracks on the sidewalls of the truck. During operation, the interaction between components of the automatically retractable roller tonneau cover can create friction and wear.

SUMMARY

An end cap for a roller tonneau cover of a truck according to an exemplary embodiment of the present disclosure includes, among other things, an end portion having a primary sliding surface and a first interlocking feature that provides an interface between the end cap and a slat of the tonneau cover, a tooth portion including teeth for engaging with a pinion gear, and a connection portion between the end portion and the tooth portion.

In another example of the foregoing end cap, the end portion, the tooth portion, and the connection portion are made from plastic and formed integrally from an injection molding.

In another example of any of the foregoing end caps, the end cap extends along a transverse direction of the truck at an assembled position. The first interlocking feature includes a first elongated protrusion and a second elongated protrusion along the two edges at the transverse direction. The first and second elongated protrusions are located adjacent to the end portion and contact the slat of the tonneau cover to create interference fits at the assembled position.

In another example of any of the foregoing end caps, the end portion includes a lateral sliding surface substantially perpendicular to a floor of a truck box at an assembled position and positioned at an end of the end portion.

In another example of any of the foregoing end caps, the primary sliding surface has a curved contour.

In another example of any of the foregoing end caps, the end cap comprises a distal portion connected to the tooth portion and having a second interlocking feature. The second interlocking feature includes a third elongated protrusion and a fourth elongated protrusion along two edges of the distal portion at the transverse direction. The third and fourth elongated protrusions contact the slat of the tonneau cover to create interference fits at the assembled position.

In another example of any of the foregoing end caps, a lower surface of the tooth portion has a waved profile to form two teeth in a middle portion and two half-teeth at edges for engaging with the pinion gear.

In another example of any of the foregoing end caps, the tooth portion includes two channels recessed from an upper surface of the tooth portion for receiving two projections of the slat of the tonneau cover. Each channel has a sloped guide surface to facilitate an insertion into the slat.

In another example of any of the foregoing end caps, the connection portion is an elongated block.

In another example of any of the foregoing end caps, the connection portion includes two elongated blocks spaced apart each other.

Another example of any of the foregoing end caps includes first and second distal portions connected to the two elongated blocks. Each of the first and second distal portions includes a third elongated protrusion and a fourth elongated protrusion along two edges of the two elongated blocks at the transverse direction. The third and fourth elongated protrusions contact the slat of the tonneau cover to create further interference fits at the assembled position.

A tonneau cover assembly of a truck according to another exemplary aspect of the present disclosure includes, among other things, a tonneau cover comprised of a plurality of slats. The plurality of slats extends at a transverse direction of the truck. The tonneau cover assembly further comprises a plurality of end caps, and each slat is mounted with two end caps. Each end cap includes an end portion including a primary sliding surface facing a bottom of a guide track of the truck, a lateral sliding surface an end of the end portion, and a first interlocking feature for interfacing with the bottom of the slat, a tooth portion including teeth, and a connection portion between the end portion and the tooth portion. The end cap is formed as a single piece. The tonneau cover assembly further comprises a driving mechanism for moving the tonneau cover and the driving mechanism includes two pinion gears to engage with the tooth portions of the end caps and move the tonneau cover between an open position and a closed position. The tooth portions of the plurality of the end caps collectively form two racks to engage with the pinion gears. The plurality of slats are coupled to two guide tracks on a truck box via the end caps and moveable via an engagement of the rack with the pinion gear of the driving system.

In a further embodiment of the forgoing assembly, each slat has a flat upper surface and two projections extended from a bottom surface for mating with a corresponding end cap.

In a further embodiment of any of the forgoing assemblies, the first interlocking feature includes a first elongated protrusion and a second elongated protrusion along two edges of the extension at the transverse direction. The first and second elongated protrusions contact a bottom surface of the slat to create interference fits.

In a further embodiment of any of the forgoing assemblies, each end cap further comprises a distal portion connected to the tooth portion, wherein the distal portion includes a third elongated protrusion and a fourth elongated protrusion along two edges of the distal portion at the transverse direction. The third and fourth elongated protrusions contact the slat to create interference fit.

In a further embodiment of any of the forgoing assemblies, each of the slats includes an upper plate and two projections extending from the upper plate and adjacent two edges along the transverse direction. The tooth portion of each of the end cap includes two channels recessed from an upper surface of the tooth portion for receiving two projections of the slat.

In a further embodiment of any of the forgoing assemblies, the slats each include a lower plate spaced apart from the upper plate and disposed between the two projections. The lower plate is disposed away from the upper plate to create a space to receive the end cap.

In a further embodiment of any of the forgoing assemblies, the driving mechanism includes an intermediate gear concentric with the pinion gear and disposed adjacent to one of the pinion gears, a common shaft connecting the two pinion gears and the intermediate gear, a driving gear, and a motor connected to the driving gear. The motor is disposed adjacent to one sidewall of the truck box.

In a further embodiment of any of the forgoing assemblies, the tonneau cover comprises a plurality of seals mounted between adjacent slats and extending along the transverse direction to connect the slats.

In a further embodiment of any of the forgoing assemblies, the common shaft has a spline to connect one of the two pinions and the intermediate pinion in a fixed position with respect to each other.

In a further embodiment of any of the forgoing assemblies, the end cap includes two teeth at a middle portion and two half teeth at edges. One half teeth at an edge from an end cap and one half teeth at an edge from an adjacent cap form one teeth, and the teeth from the end caps collectively form a rack for an engagement with the two pinion gears.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details, among other things, end caps for a retractable roller tonneau cover of a truck and the associated roller tonneau cover assemblies. The detailed description and figures provide merely examples of the various inventions described herein. Those skilled in the art will understand that the disclosed examples may be varied, modified, and altered without departing from the scope of this disclosure. Many variations are contemplated for different applications and design considerations; however, for the sake of brevity, each and every contemplated variation is not individually described in the following detailed description.

Throughout the following detailed description, examples of various embodiments of end caps for a retractable roller tonneau cover and the roller tonneau cover assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
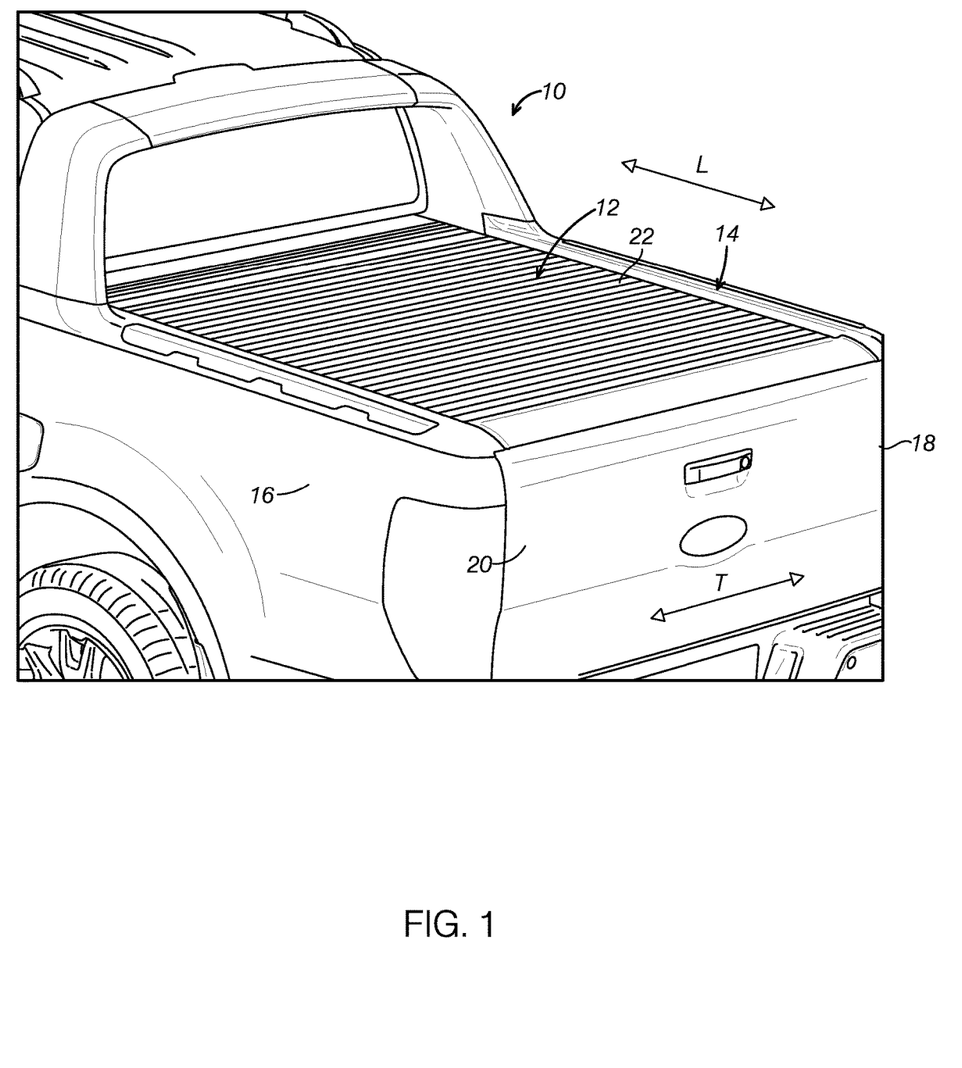
FIG. 1 is a partial perspective view of a truck with a retractable roller tonneau cover accordingly to an exemplary embodiment of the present disclosure.

FIG. 1 is a partial perspective view of a truck 10, illustrating a retractable roller tonneau cover 12 at a closed position. As shown, the retractable roller tonneau cover 12 can extend to completely cover a box 14 (or bed) of the truck 10 at a closed position. The box 14 of the truck 10 comprises two laterally spaced sidewalls 16 and 18, and a tailgate 20. The tonneau cover 12 includes a plurality of slats 22 which extend laterally across the truck box at a transverse direction T of the truck 10 and are interconnected consecutively along a longitudinal direction L of the truck 10 to form the tonneau cover 12 collectively. The tonneau cover 12 is moveably connected to a pair of guide tracks (not shown in FIG. 1) which are coupled to top edges of the respective sidewalls 16, 18 of the truck box 14. The tonneau cover 12 can be operated by a driving mechanism to move between a closed position and an opened position.

Figure 2:
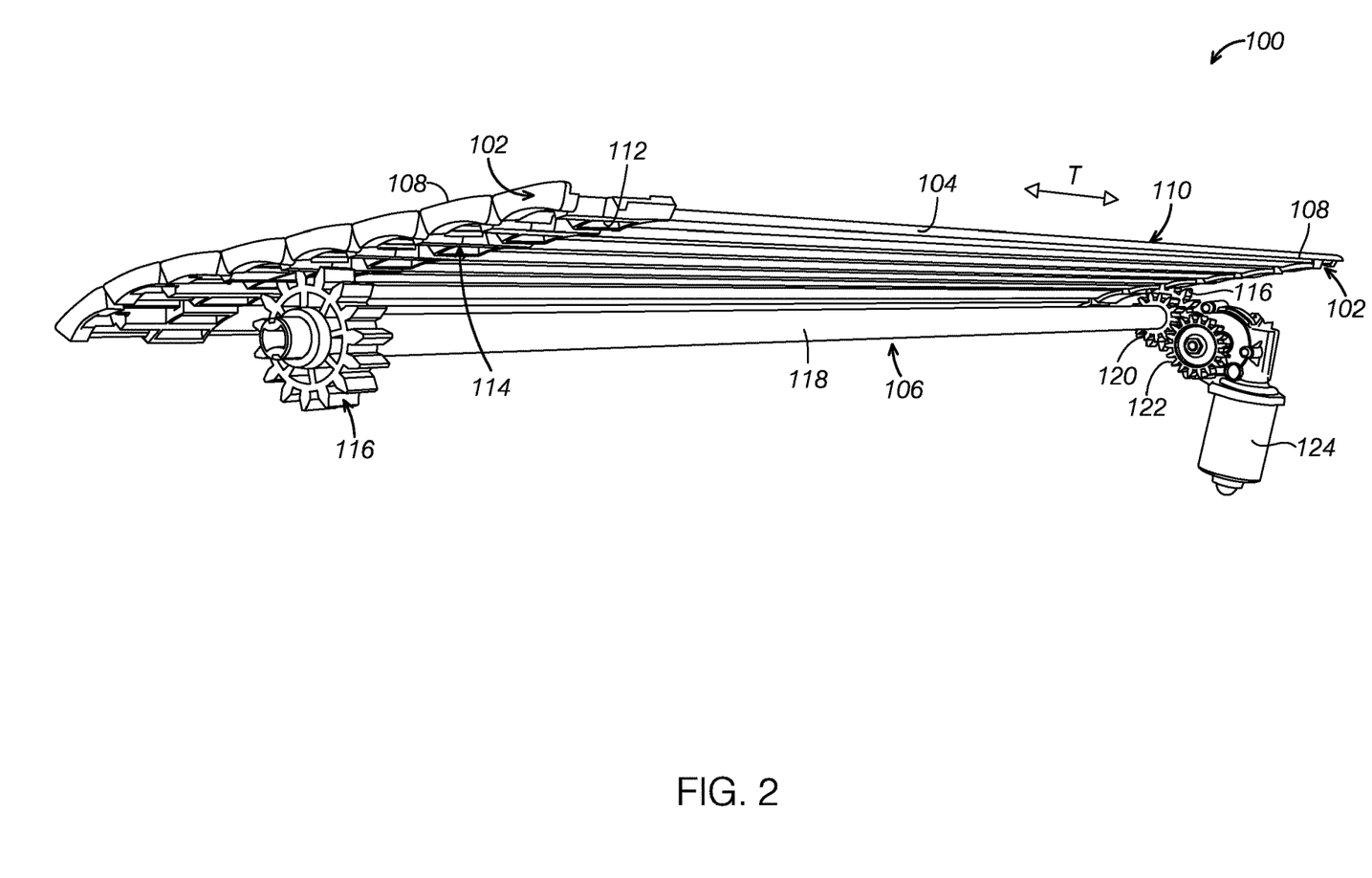
FIG. 2 is a perspective view of a retractable roller tonneau cover assembly according of FIG. 1.
Figure 3:
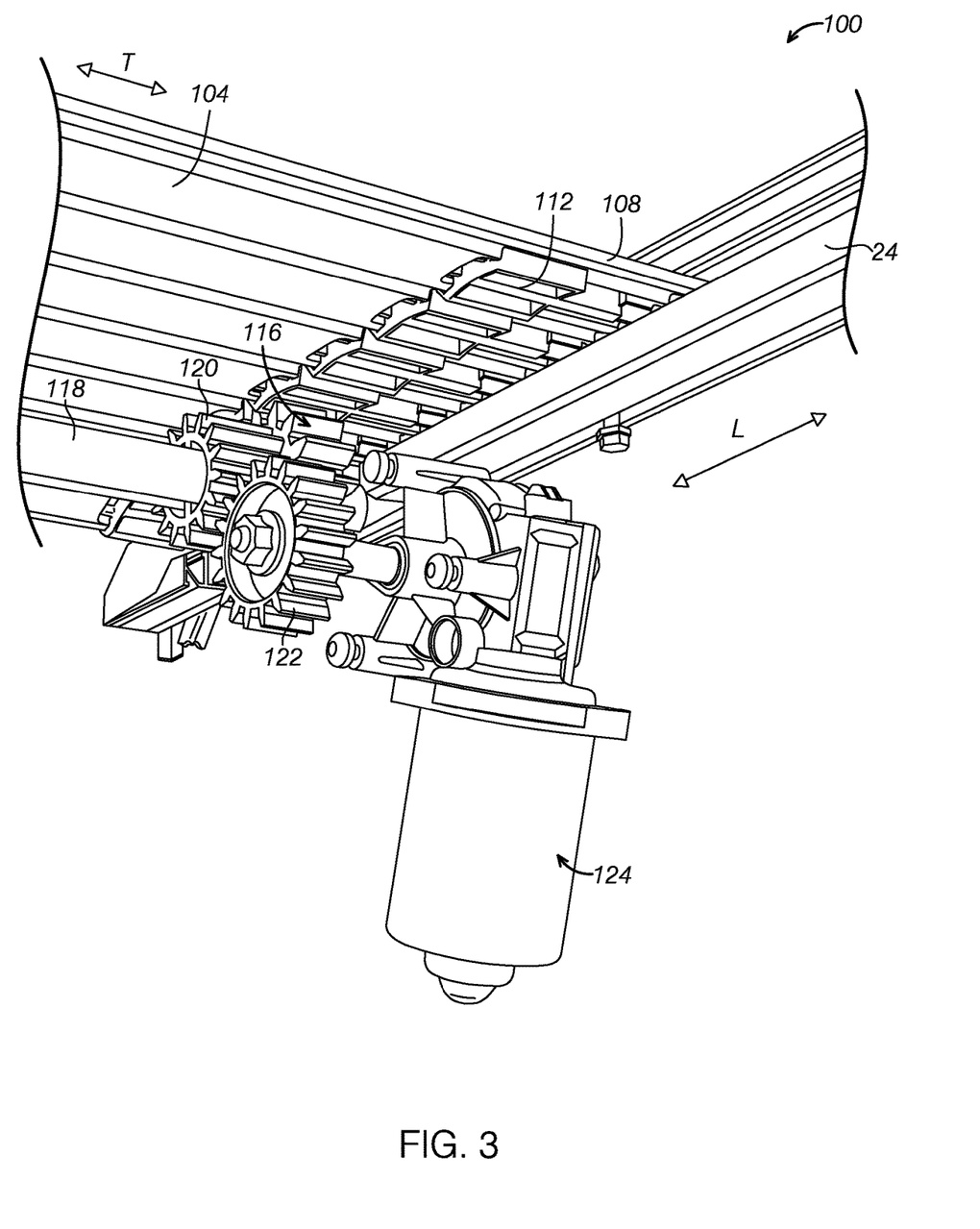
FIG. 3 is partial perspective view of the retractable roller tonneau cover assembly in FIG. 2.
Figure 4:
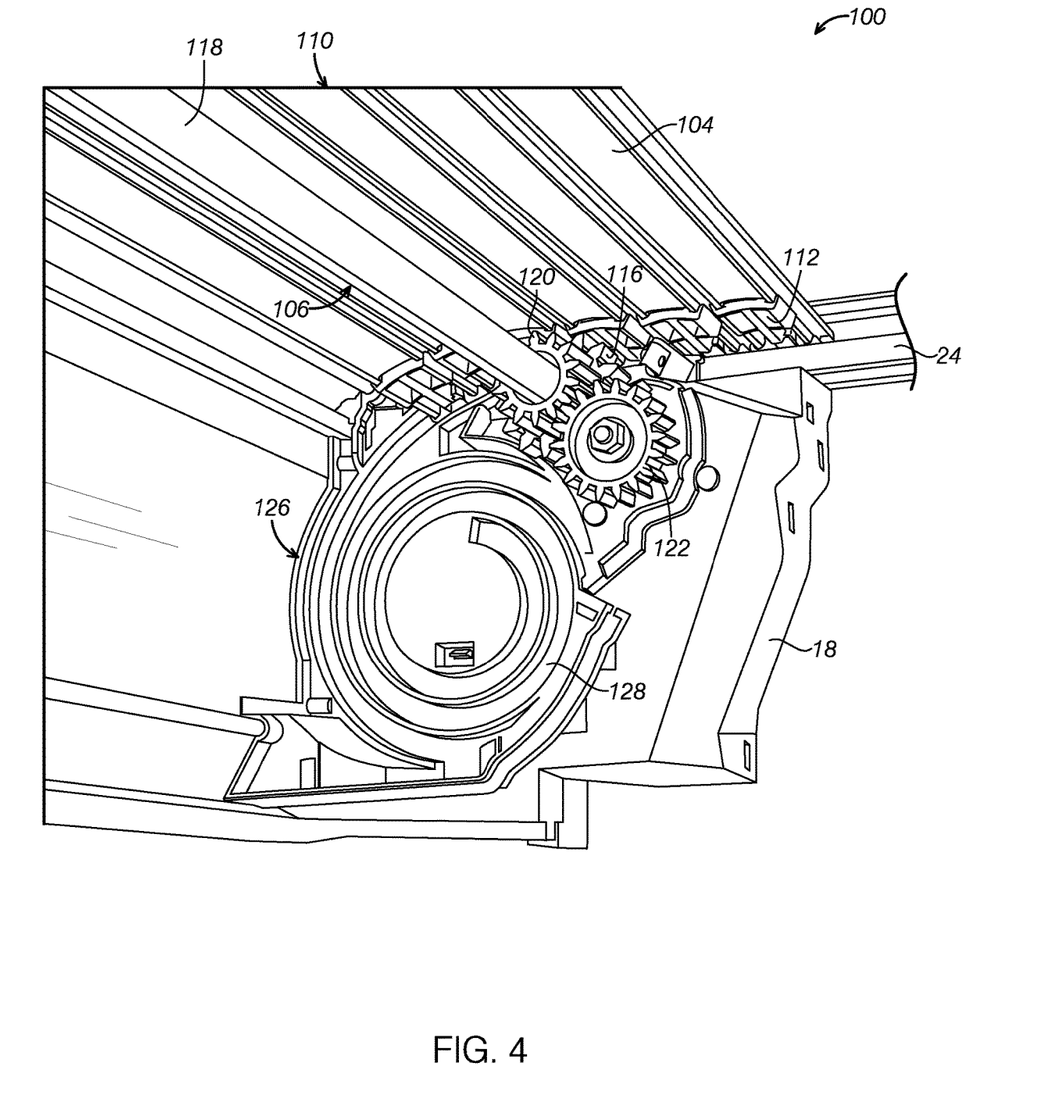
FIG. 4 is another perspective view of the retractable roller tonneau cover assembly in FIG. 2 illustrating a cutaway view of a cover housing.
Figure 5:
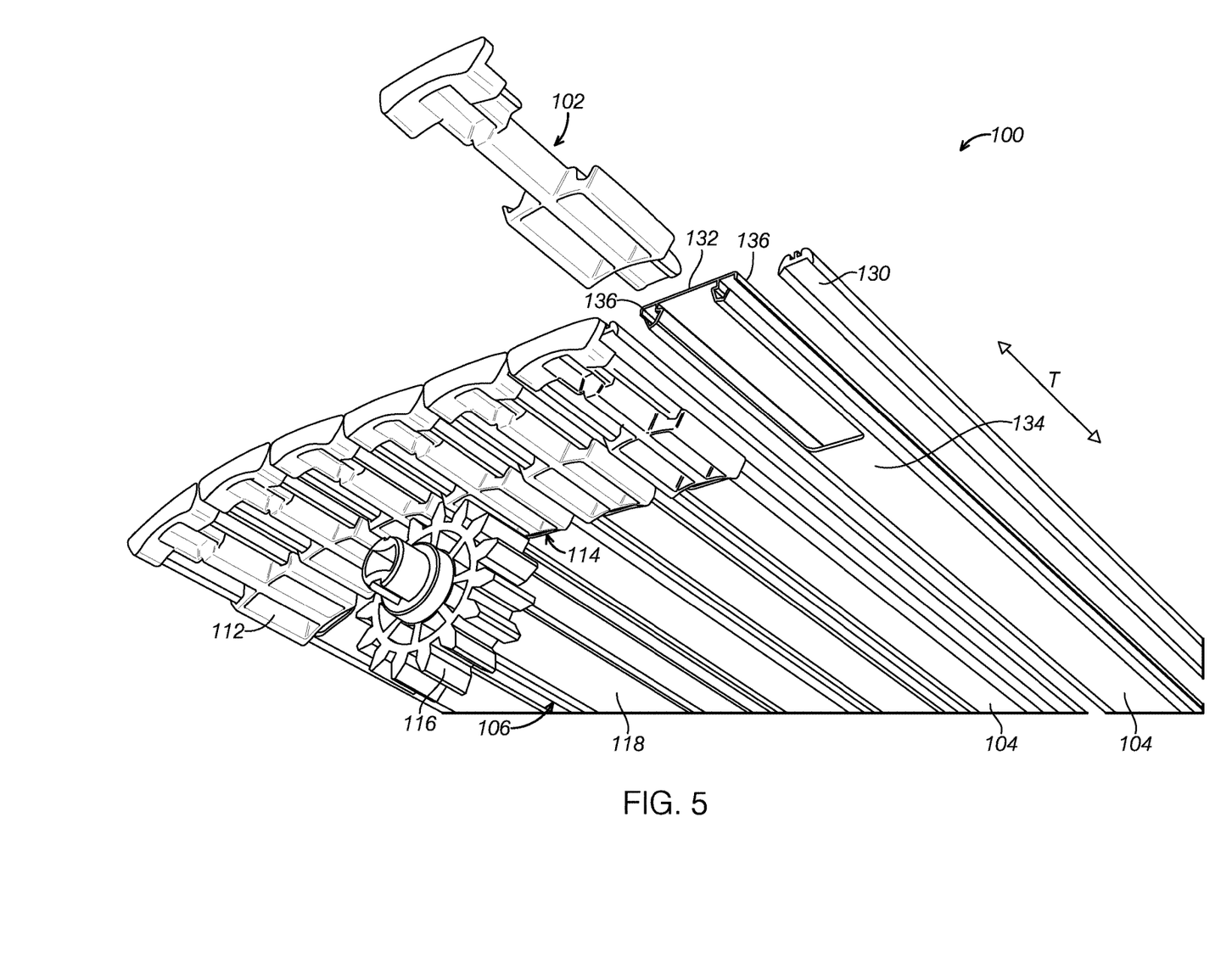
FIG. 5 is an exploded view of the retractable roller tonneau cover assembly in FIG. 2.

FIGS. 2-5 show a roller tonneau cover assembly 100 according to an exemplary embodiment of the present disclosure. FIG. 2 is a perspective view of the partial retractable roller tonneau cover assembly 100. FIGS. 3-4 are enlarged views of partial roller tonneau cover assembly 100. FIG. 5 is an expanded view of end caps 102, partial slats 104 and a driving mechanism 106.

With reference to FIGS. 2-4, the roller tonneau cover assembly 100 comprises end caps 102, slats 104 and the driving mechanism 106. In some embodiments, each slats 104 may be made from a narrow and thin sheet metal. Alternatively, the slats 104 may be made of plastic or a composite material. The slats 104 extend at the transverse direction T of the truck between the sidewalls 16, 18 of the truck box 14. Seals (not shown in FIG. 2) are mounted between adjacent slats and extend along the transverse direction T to connect the slats. The seals connect with the adjacent slats and provide a continuous cover to prevent water from entering the truck box by the sealing the space between the slat edges of the cover.

Each slat 104 is mounted with two end caps 102 at its two ends 108, respectively. That is, the end caps 102 are fixed to the slats 104 to form a roller tonneau cover 110. The end cap 102 is further moveably connected with the guide track in the sidewalls 16, 18 of the truck. The end cap 102 further includes a tooth portion 112. The tooth portions 112 of the plurality of the end cap 102 collectively form a rack 114 for engaging with the driving mechanism 106.

The driving mechanism 106 may include two pinion gears 116, a common shaft 118 connecting the two pinion gears 116, an intermediate gear 120 concentric with the pinion gears 116 and connected on the common shaft 118, a driving gear 122 engaged with the intermediate gear 120. The two pinion gears 116 are mounted adjacent two ends 108 of the slats 104 respectively to engage with the rack 114 or the tooth portion 112 of the end caps 102. The driving mechanism 106 is mounted to the truck box 14 of the truck and adjacent to one end of the tonneau cover 110. The driving mechanism 106 further includes an electric motor 124 connected to the driving gear 122 and the driving gear 122 is further engaged to the intermediate gear 120. In an embodiment, the common shaft 118 has a spline to connect the two pinion gears 116 and the intermediate pinion 120 in a fixed position with respect to each other. In an embodiment, the ends of the common shaft 118 are rotatably supported via brackets (not shown) in the sidewalls 16, 18 of the truck 10.

Referring to FIG. 3, portions of the driving mechanism 106 used for moving the tonneau cover 110 re further illustrated. The two pinion gears 116 engage with the tooth portions 112 of the end caps 102 at both ends of the slats 104 and move the tonneau cover 110 between an opened or retracted position and a closed or an extended position. The two pinion gears 116 are connected to the shaft 118 at two ends of the shaft 118. The shaft 118 extends along a lengthwise direction of the slats 104 or the transverse direction T of the truck. The intermediate gear 120 is mounted to the shaft 118, adjacent and connected to the pinion gear 116. In one embodiment, the pinion gear 116 and the intermediate gear 120 could be formed as a single piece. The pinion gears 116 and the intermediate gear 120 are rigidly mounted to the shaft 118 and rotate in synchronization with each other and with the shaft.

Referring to FIG. 11, FIGS. 2-4 and with further reference to FIG. 1, the plurality of slats 104 are coupled to the two guide tracks 24 on the sidewalls 16, 18 of the truck box 14 via the end caps 102 and are moveable via an engagement of the rack 114 with the pinion gear 116 of the driving mechanism 106. The driving mechanism 106 includes the electric motor 124 disposed adjacent to one of the sidewalls 18 of the truck box 14. The electric motor 124 drives a driving gear 122 which in turn is connected to the intermediate gear 120 on the shaft 118, thereby rotating the shaft 118 as well as the pinion gears 116 connected to the shaft 118. The driving gears 122, intermediate gear 120 and pinion gears 116 are sized to match the speed of the electric motor 124 and achieve the required speed of movement of the tonneau cover 110. In one embodiment, the speed of the electric motor 124 is variable according to the requirement of the user. The rotation of the pinion gears 116 in turn causes movement of the rack 114 thereby causing movement of the tonneau cover 110 on the guide tracks 24. Each guide track 24, in the exemplary embodiment, includes upper and lower flanges 307 and 308 above and below the track thereof to guide the end cap of the slats for movement within the track.

Referring to FIG. 4, a cutaway view of a cover housing 126 is shown. The housing 126 is disposed adjacent to the motor 124 of the driving mechanism 106 and mounted to the sidewall 18 of the truck box 14. The housing 126 includes a spiral reeling space 128 to provide a storage compartment for the tonneau cover 110 in the truck box 14 when the tonneau cover 110 is completely or partially retracted to expose the truck box.

Referring to FIG. 5, the tonneau cover assembly 100 further includes a plurality of seals 130 mounted between adjacent slats 104 and extending along the transverse direction T to connect the slats 104. The seals 130 provide sealing and drainage means in the form of a channel for the natural drainage of water from the tonneau cover 110. The seals 130 also seal out water, dust and dirt from entering the truck box when the tonneau cover 110 is at the closed position to cover the truck box. Each of the slats 104 may be of substantially the same configuration and dimension and are preferably made of one piece of extruded aluminum material. The slat 104 has a flat upper surface 132, a bottom surface 134 and parallel side edge portions 136. The slat 104 is mounted with two end caps 102 at its both ends. The tonneau cover 110 is formed by a plurality of slats continuously connected to each other along their transverse length and a plurality of end caps 102. The tonneau cover 110 is extended or retracted by the driving mechanism located at the truck box. The driving mechanism 106 includes pinion gears 116 which engage with the rack 114 formed by the tooth portions 112 of the plurality of end caps 102.

Figure 6:
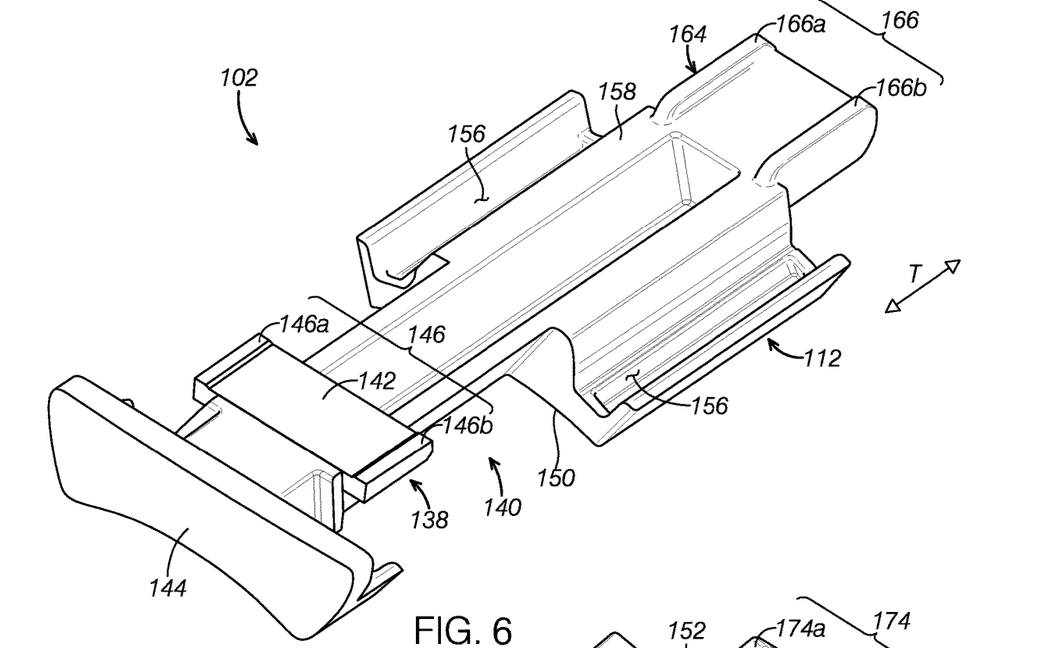
FIG. 6 is a perspective top view of an end cap from the assembly of FIG. 2.
Figure 7:
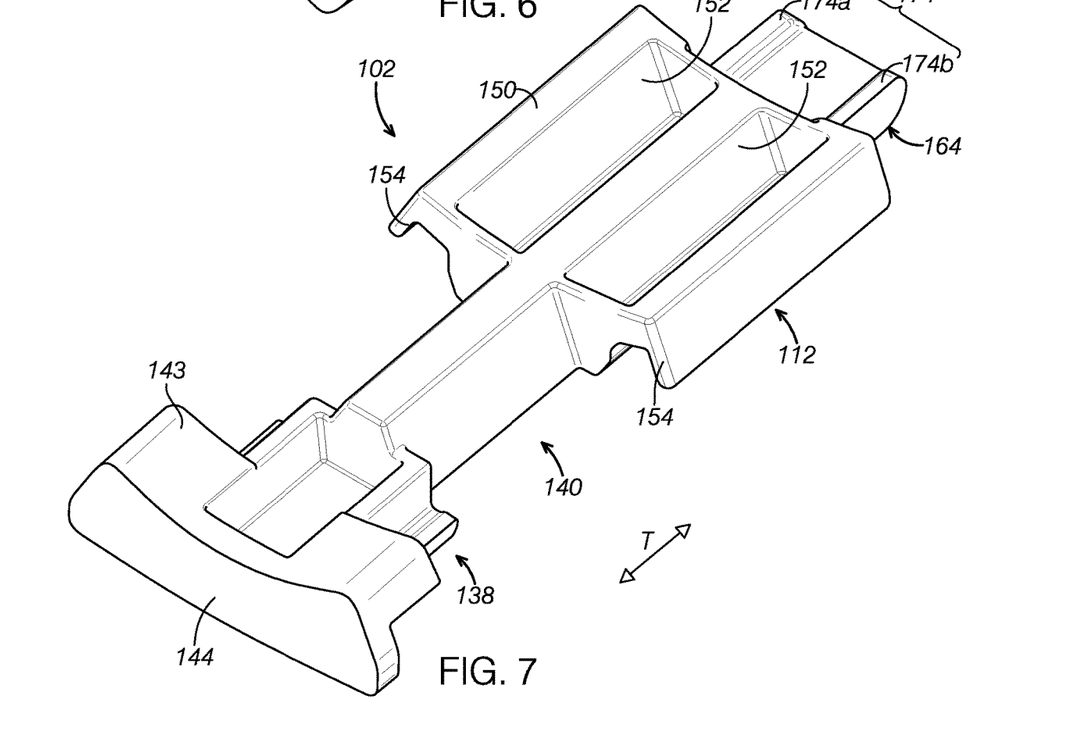
FIG. 7 is a bottom perspective view of the end cap in FIG. 6.

Referring to FIGS. 6 and 7, FIG. 6 is a perspective top view of the end cap 102 and FIG. 7 is a perspective bottom view of the end cap 102. As shown in FIG. 6, the end cap 102 includes an end portion 138, the tooth portion 112 and a connection portion 140 between the end portion 138 and the tooth portion 112. The end portion 138 may include a horizontal upper surface 142, a primary sliding surface 143, a lateral sliding surface 144, and a first interlocking feature 146 that provides an interface between the end cap 102 and a slat 104 of the tonneau cover 110.

The lateral sliding surface 144 may be substantially perpendicular to a floor of the truck at an assembled position and positioned at an end of the end portion 138. In one embodiment, the primary sliding surface 143 has a curved contour. The curved portion at the bottom of the end cap slides over the guide tracks 24 on the truck box 14.

The first interlocking feature 146 may include a first elongated protrusion 146a and a second elongated protrusion 146b along two edges at the transverse direction T of the truck. The elongated protrusions 146a, 146b are disposed adjacent to the lateral sliding surface 143 or the primary sliding surface 143 and extend out from the horizontal surface 142. The first and second elongated protrusions 146a, 146b contact the slat 104 of the tonneau cover 110 to create interference fits at the assembled position. The tooth portion 112 is spaced apart from the end portion 138 and coupled with the end portion 138 through the connection portion 140. In the depicted embodiment, the connection portion 140 is a single elongated block.

Figure 12:
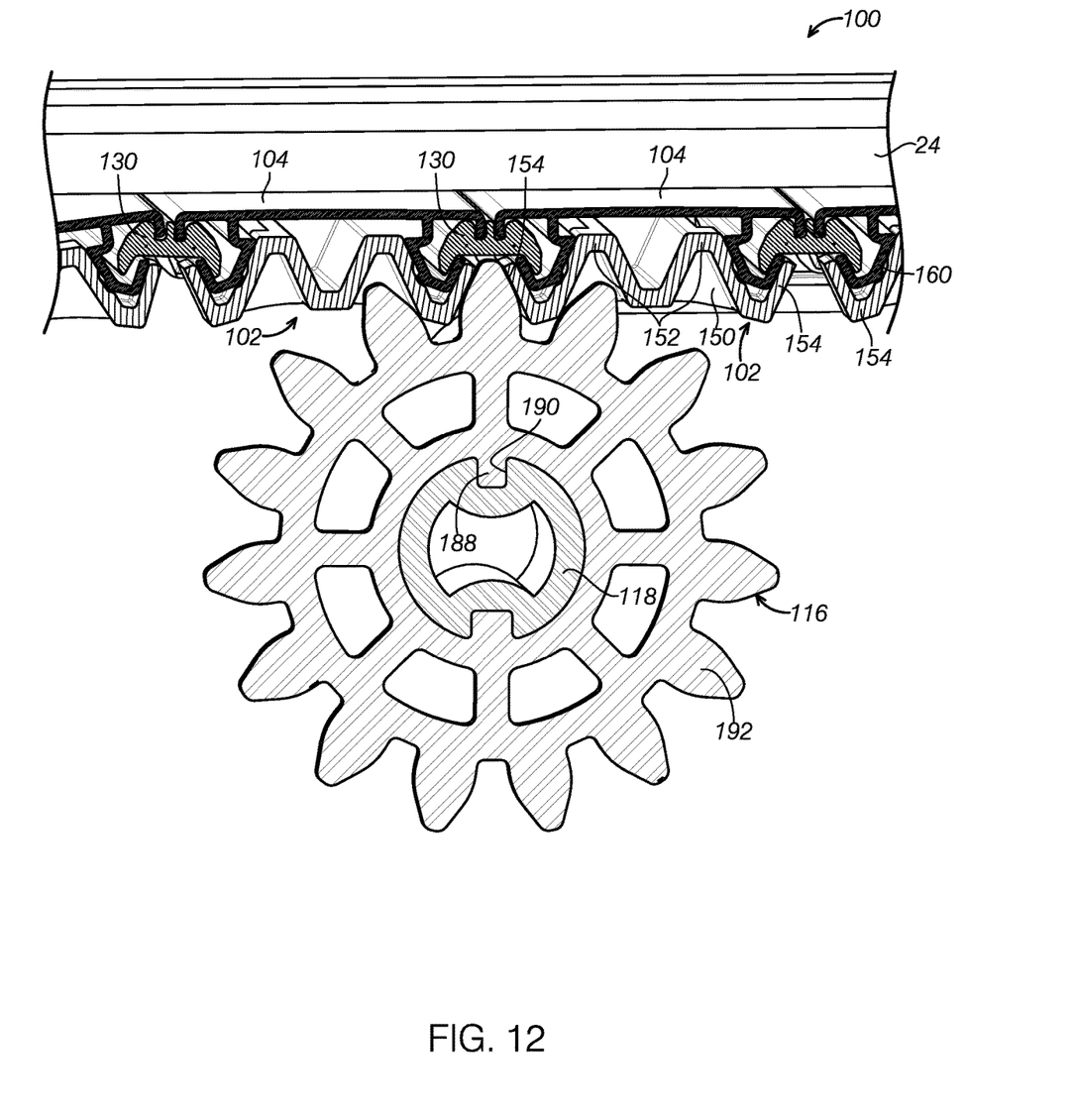
FIG. 12 is a partial cross-sectional view of a retractable roller tonneau cover assembly, illustrating an engagement of the tooth portion of the end cap with the pinion gear.

The tooth portion 112 has the teeth for engagement with the pinion gear 116 of the driving mechanism 106. With further reference to FIG. 12, a lower surface 150 of the tooth portion 112 has a waved profile to form two teeth 152 in a middle portion and two half-teeth 154 at edge portions for engaging with the pinion gear 116. The two half-teeth 154 from two adjacent end cap 102 form one tooth and thus a continuous rack is formed for engagement with the pinion gear 116. The teeth are sized according to the pitch of the pinion gear 116.

Referring to FIGS. 6, 8, 10, and 12, the tooth portion 112 includes two channels 156 recessed from an upper surface 158 of the tooth portion 112 of the end cap 102. The two channels 156 receive two projections 160 of the slat 104 of the tonneau cover 110. The projections 160 extend down from an upper plate 162 of the slat 104. The channel 156 has a sloped guide surface to facilitate an insertion into the slat 104.

Turning to FIG. 6, the end cap 102 may further include a distal portion 164 connected to the tooth portion 112. The distal portion 164 has a second interlocking feature 166. The second interlocking feature 166 may include a third elongated protrusion 166a and a fourth elongated protrusion 166b along two edges of the distal portion 164 at the transverse direction T. The third and fourth elongated protrusions 166a, 166b contact the slat 104 of the tonneau cover to create interference fits at the assembled position.

Figure 8:
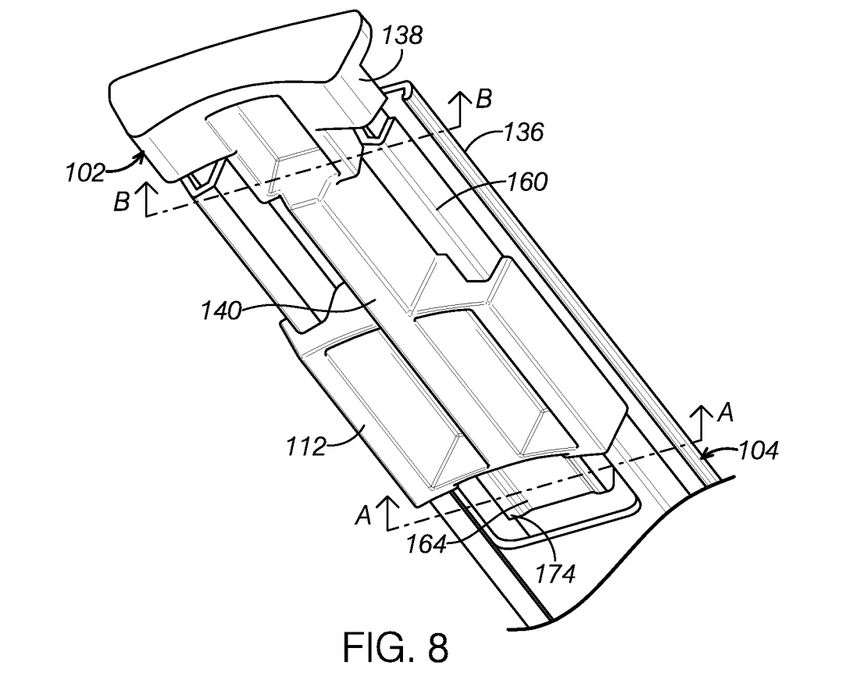
FIG. 8 is a perspective view of the end cap in FIG. 6 and a slat.
Figure 9:
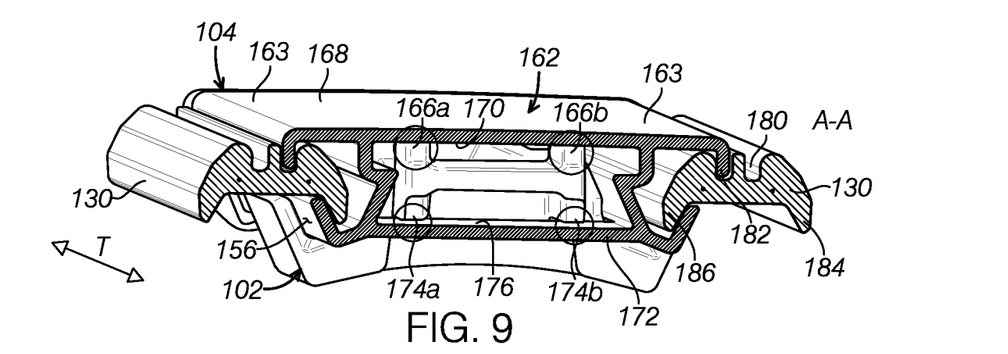
FIG. 9 is a cross sectional view of the end cap taken at line A-A in FIG. 8.
Figure 10:
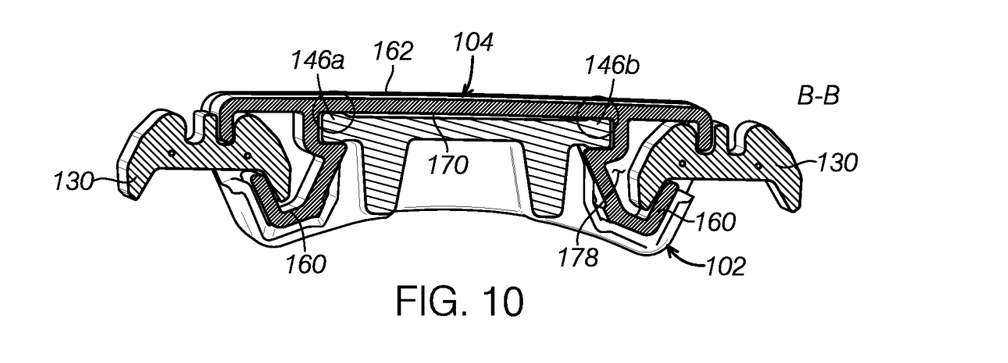
FIG. 10 is a cross sectional view of the end cap taken at line B-B in FIG. 8.

FIG. 8 is another perspective view of the end cap 102 and the slat 104, illustrating a position when the cap is partially inserted into the slat 104. FIG. 9 is a cross sectional view of the end cap 102 and the slat 104 along the section A-A. FIG. 10 is a cross sectional view of the end cap 102 and the slat 104 along the section B-B. The slat 104 has an upper plate 162 having a flat upper surface 168 and two projections 160 extended from a lower surface 170 of the upper plate 162 and adjacent two edges 163. As can be seen from FIGS. 8-10, the projections 160 of the slat 104 are received in two channels 156 of the tooth portion 112. The slat 104 may further include a lower plate 172 spaced apart from the upper plate 162 and disposed between the two projections 160a, 160b. An upper surface 176 of the lower plate 172 is disposed away from the lower surface 170 of the upper plate 162 to create a space to receive the end cap 102. In one embodiment, the two projections 160a, 160b at the both ends of the slat 104 are limited to the length of the end cap 102 and does not run throughout the length of the slat 104. The two projections 160a, 160b are received in the two channels 156 on the tooth portion 112 of the end cap 102 and guide the insertion of the end cap into the slats. The projections 160a, 160b of the slat 104 and the channels 156 of the tooth portion 112 of the end cap 102 may form a snug fit or an interference fit.

As shown in FIG. 9, as the end cap 102 is inserted into the slat 104 or at an assembled position, the second interlocking feature 166a, 166b at the distal portion 164 of the end cap 102 engage with the lower surface 170 of the slat 104 to create an interference fit. In some embodiments, the distal portion 164 may further include a third interlocking feature 174 which are a fifth and sixth elongated protrusions 174a, 174b extending from a lower surface of the distal portion 164. The third interlocking feature 174 may contact an upper surface 176 of the lower plate 172 of the slat 104 to create an interference fit. The slat 104 has a hollow interior portion between the upper plate 162 and lower plate 172 of the slat 104 to receive the distal portion 164 to establish interference fit between the slat 104 and the second and third interlocking features 166, 174 of the distal portion 164. In one embodiment, the third and fourth elongated protrusions 166a, 166b may have beveled edges to facilitate an entry into the lower surface 170 of the upper plate 162 and the upper surface 176 of the lower plate 172 of the slat 104.

As shown in FIG. 10, the first interlocking features 146a, 146b at the end portion 138 of the end cap 102 contact the lower surface 170 of the slat 104 to create interference fits at the assembled position. As the interlocking feature includes elongated protrusions at the transverse direction T, a linear contact or contact in certain areas are created, which resulting desired mating or interference fit.

The end cap 102 may be made from plastic and formed as one piece in an injection molding. In some embodiments, the end cap may be made from low friction and wear material such as polyacetal (POM).

FIGS. 9 and 10 further show seals 130 mounted on the edges of slats 104 and extending along the transverse direction T to connect the slats. The seals 130 may be made of elastic material such as rubber and run along the length of the slat. The seal 130 can be slidably inserted in a receiving portion 178 in the slat 104 prior to the installation of the end cap 102. The receiving portion 178 is the open portion between the upper plate 162 of the slat 104 and the projections 160 of the slat 104. The end caps 102, once installed, prevent the seals from sliding out of the slats during use. The upper surface of the seal 130 has two grooves 180 and 182 and the lower surface of the seal 130 has two projections 184, 186. The seal 130 is inserted into space in the projections 160. The seal 130 connects two adjacent slats and acts as a structural member to hold the slats together to form the tonneau cover but still allows flexibility during opening and closing movement of the tonneau cover due to their flexible material properties.

Figure 11:
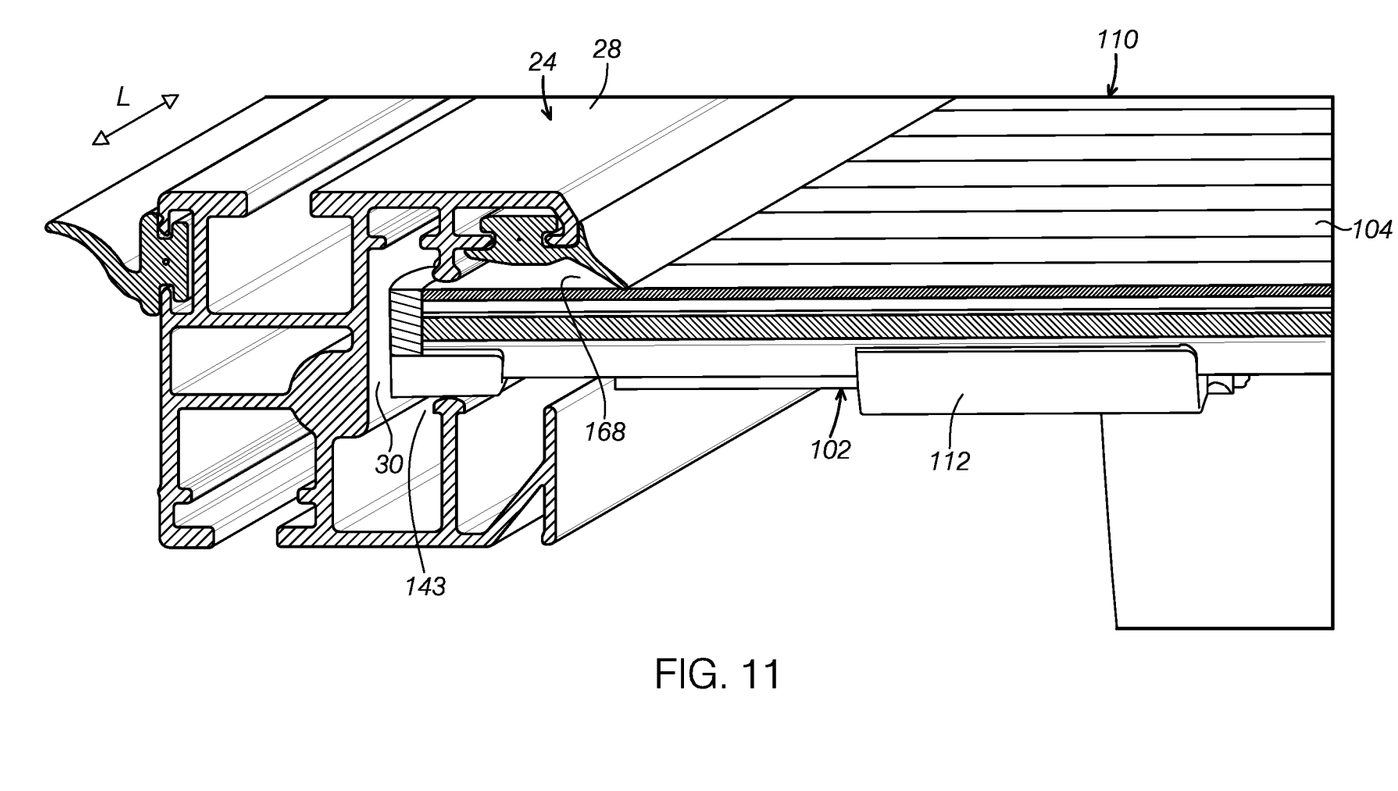
FIG. 11 is a perspective view of the retractable roller tonneau cover assembly of FIG. 2 mounted on a guide tracks on the truck box.

FIG. 11 is a perspective view of the roller tonneau cover assembly 100, illustrating the tonneau cover assembly mounted on the guide tracks 24. FIG. 11 only shows one guide track 24 connected with the tonneau cover 110. As shown in the FIG. 11, the tonneau cover 110 is connected to the guide track 24 located on a truck box 14. The plurality of slats 104 are coupled to the guide track 24 via the end caps 102 and the tonneau cover 110 is moveable via an engagement of the rack 114 or the tooth portion 112 with the pinion gears 116 of the driving mechanism 106. The guide track 24 is mounted at a longitudinal direction L of the truck along an upper flange portion of the sidewalls 16, 18 of the truck. As shown in FIG. 11, in one embodiment, the guide track 24 comprise elongated track members 28 having an open C-shaped channel 30 and may be formed, for example, as a single piece. The end caps 102 are received through the opening in the C-shaped channel 30. The primary sliding surface 143 of the end portion 138 of the end cap 102 slides over the lower portion of the C-shaped channel as the tonneau cover 110 moves on the guide tracks 24. In some embodiments, the guide track 24 terminates at a location adjacent to the tailgate at the rear of the truck box. The upper surface 168 of the slats 104 faces the upper portion of the C-shaped channel but do not contact the C-shaped channel and have a clearance to allow smooth sliding. In one embodiment, a weather strip mounted to the upper portion of the C-shaped channel and extending along the length of the guide tracks covers a portion of the tonneau cover 110 adjacent to the guide tracks 24 to prevent entry of dust and debris.

In another embodiment, the guide tracks 24 may be extended down to the floor. In this embodiment, when the tailgate of the truck is removed or absent, the rear opening of the truck box will be covered by driving the cover unit to the floor at the rear of the truck box.

FIG. 12 is a cross sectional view of the roller tonneau cover assembly 100 engaged with the pinion gear 116 of the driving mechanism 106. The tooth pitch of the pinion gear 116 may be set to match the tooth profile of the end caps 102 in the tonneau cover 110. The two pinion gears 116 on both sides of the slats 104 are connected to the common shaft 118 to rotate in sync with each other. This prevents jamming of the tonneau cover during movement. In one embodiment, only one of the pinion gears 116 on one side of the slats is driven by the motor and its motion is transferred to the other pinion gear 116 via the common shaft 118. The common shaft 118 passes through the center of the pinion gears 116 which have a key 188 to be received in a recess 190 on the common shaft 118. As shown in FIG. 12, the tooth portion of each end cap has two teeth 152 in the middle portion and two half-teeth 154 at edge portions for engaging with the teeth 192 of the pinion gear 116. The tooth portion 112 also includes two channels 156 recessed from the upper surface 158 of the tooth portion 112 for receiving two projections 160 of the slat 104 of the tonneau cover 110 and each channel 156 has a sloped guide surface to facilitate an insertion into the slat 104. Seals 130 are mounted between adjacent slats 104 and extending along the transverse direction T to connect the slats 104.

The end cap is fabricated as a single piece according to the embodiment of the present disclosure. The single piece can minimize friction and wear in the operation of a roller tonneau by reducing the number of parts and their connection. A plurality of interlocking features are integrated on the end cap and the interference fit is created via geometric configuration of the end cap. Thus, a secondary fixings such as screws are not needed at some configurations. Further, the functional surfaces such sliding surfaces still perform their function while desired interference is achieved. Furthermore, the end cap is integrated with the tooth portion, which forms a rack for engagement with the pinion gears to realize a powered roller tonneau cover.

Figure 13:
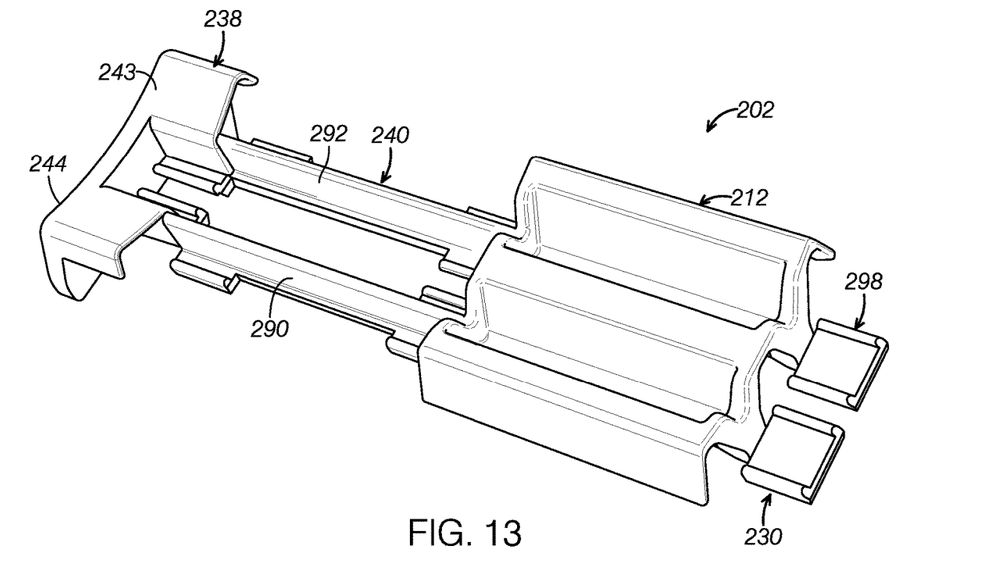
FIG. 13 is a perspective bottom view of an end cap according to another exemplary embodiment of the present disclosure.
Figure 14:
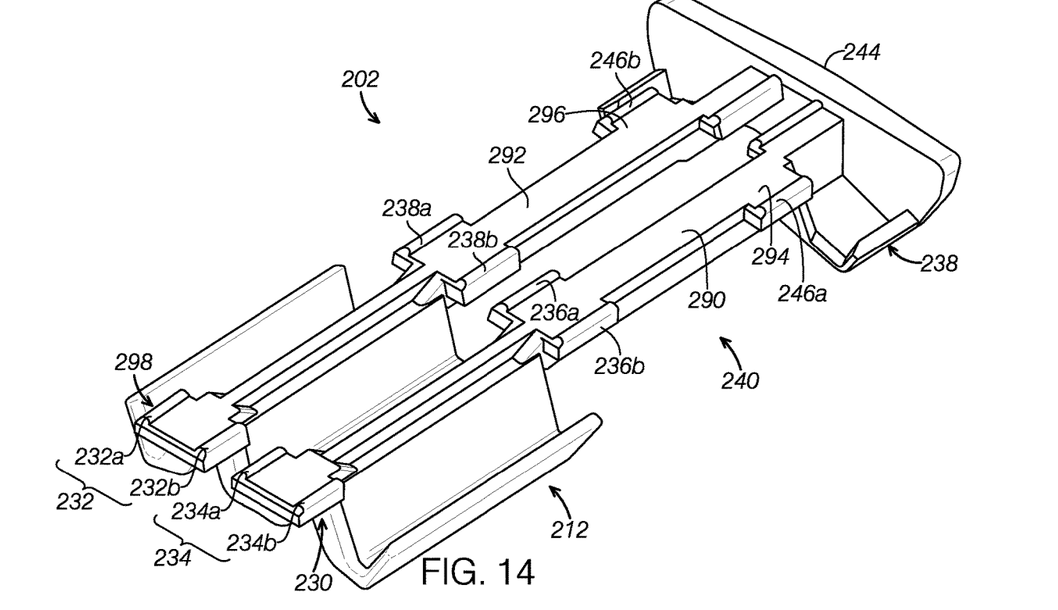
FIG. 14 is a perspective top view of the end cap in FIG. 13.

FIGS. 13 and 14 are perspective views of an end cap 202 for a tonneau cover of a truck according to another exemplary embodiment of the present disclosure. For the sake of brevity, in this example, the elements and features similar to those previously shown and described will not be described in much further detail. In other words, differences between the present embodiment and the embodiment of FIGS. 2-12 will be mainly described. As shown in FIGS. 13-14, the end cap 202 includes an end portion 238, a tooth portion 212 and a connection portion 240 between the end portion 238 and the tooth portion 212, and a first interlocking features that provides an interface between the end cap 202 and a slat 104 of the tonneau cover. The end portion 238 may include a primary sliding surface 243, and a lateral sliding surface 244, and the first interlocking features 246a, 246b that provides an interface between the end cap 202 and a slat 104 of the tonneau cover 110. In the depicted embodiment, the connection portion 238 includes two elongated blocks 290, 292 spaced apart each other. The first interlock features 246a, 246 may be formed on the first elongated block 290 and the second elongated block 292, respectively and face a lower surface of the slat 104 at an assembled position. The first interlock features 246a, 246b may be elongated protrusions formed on upper surfaces 294, 296 of the first and second elongated blocks 290, 292 along outer edges and adjacent to the end portion 238.

The end cap 202 may further includes two distal portions 298, 230 connected at a distal end of the end cap 202. Each of the distal portions 298, 230 may include second interlocking features 232, 234, respectively. The second interlocking feature 232 may include third and fourth elongated protrusions 232a, 232b. The second interlocking feature 234 may include third and fourth elongated protrusions 234a, 234b.

In some embodiments, the end cap 202 may further include third interlocking features 236a, 236b formed on the elongated blocks 290 and 238a, 238b formed on the elongated blocks 292. The third interlocking features 236a, 236b, 238a, 238b are positioned adjacent to the tooth portion 212.

The embodiment depicted in FIGS. 13-14 have more interlocking features integrated on the end cap and provide connection between the end cap and the slat.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions.

Further, the preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An end cap for a roller tonneau cover of a truck, comprising:
   an end portion having a primary sliding surface and a first interlocking feature that provides an interface between the end cap and a slat of a tonneau cover;
   a tooth portion including teeth for engaging with a pinion gear; and
   a connection portion between the end portion and the tooth portion.

2. The end cap of claim 1, wherein the end portion, the tooth portion and the connection portion are made from plastic and formed integrally from an injection molding.

3. The end cap of claim 2, wherein the end cap extends along a transverse direction of the truck at an assembled position, wherein the first interlocking feature includes a first elongated protrusion and a second elongated protrusion along two edges at the transverse direction, and wherein the first and second elongated protrusions are located adjacent to the connection portion and contact the slat of the tonneau cover to create interference fits at the assembled position.

4. The end cap of claim 3, wherein the end portion includes a lateral sliding surface substantially perpendicular to a floor of the truck at the assembled position and positioned at an end of the end portion.

5. The end cap of claim 4, wherein the primary sliding surface has a curved contour.

6. The end cap as of claim 3, further comprising a distal portion connected to the tooth portion and having a second interlocking features, wherein the second interlocking feature includes a third elongated protrusion and a fourth elongated protrusion along two edges of the distal portion at the transverse direction, and the third and fourth elongated protrusions contact the slat of the tonneau cover to create interference fits at the assembled position.

7. The end cap of claim 2, wherein a lower surface of the tooth portion has a waved profile to form two teeth in a middle portion and two half-teeth at edges for engaging with the pinion gear.

8. The end cap of claim 7, wherein the tooth portion includes two channels recessed from an upper surface of the tooth portion for receiving two projections of the slat of the tonneau cover and each channel has a sloped guide surface to facilitate an insertion into the slat.

9. The end cap of claim 2 wherein the connection portion is an elongated block.

10. The end cap of claim 2, wherein the connection portion includes two elongated blocks spaced apart each other.

11. The end cap of claim 10, further includes first and second distal portions connected to the two elongated blocks, wherein each of the first and second distal portions includes a third elongated protrusion and a fourth elongated protrusion along two edges of the two elongated blocks at a transverse direction of the truck, and the third and fourth elongated protrusions contact the slat of the tonneau cover to create further interference fits at the assembled position.

12. A tonneau cover assembly of a truck, comprising:
a tonneau cover comprised of a plurality of slats, wherein the plurality of slats extends at a transverse direction of the truck;
a plurality of end caps, wherein each slat is mounted with two end caps, and each end cap including:
an end portion including a primary sliding surface facing a bottom of a guide track on a truck box, a lateral sliding surface substantially perpendicular to a floor of the truck box and a first interlocking feature for interfacing with the bottom of the slat,
a tooth portion including teeth, and
a connection portion between the end portion and the tooth portion; and
a driving mechanism for moving the tonneau cover, and the driving mechanism including:
two pinion gears to engage with the tooth portions of the end caps and move the tonneau cover between an opened position and a closed position,
wherein the tooth portions of the plurality of the end caps collectively form two racks to engage with the two pinion gears respectively, the plurality of slats are coupled to two guide tracks via the end caps and moveable via an engagement of the racks with the pinion gears of the driving mechanism, and
wherein the end cap is formed as a single piece.

13. The tonneau cover assembly of claim 12, wherein each slat has a flat upper surface and two projections extended from a bottom surface of the slat for mating with a corresponding end cap.

14. The tonneau cover assembly of claim 13, wherein the first interlocking feature includes a first elongated protrusion and a second elongated protrusion along two edges at the transverse direction, and the first elongated protrusion and a second elongated protrusion extend from a horizontal surface of the end portion and contact the slat to create interference fit.

15. The tonneau cover assembly of claim 14, wherein each end cap further comprises a distal portion connected to the tooth portion, wherein the distal portion includes a third elongated protrusion and a fourth elongated protrusion along two edges of the distal portion at the transverse direction, and the third and fourth elongated protrusions contact the slat to create interference fit.

16. The tonneau cover assembly of claim 15, wherein each of the slat includes an upper plate and two projections extending from the upper plate and adjacent two edges along the transverse direction and wherein the tooth portion of each of the end cap includes two channels recessed from an upper surface of the tooth portion for receiving two projections of the slat.

17. The tonneau cover assembly of claim 16, wherein the slat includes a lower plate spaced apart from the upper plate and disposed between the two projections, wherein the lower plate is disposed away from the upper plate to create a space to receive the end cap.

18. The tonneau cover assembly of claim 17, wherein the driving mechanism includes:
an intermediate gear concentric with the pinion gear and disposed adjacent to one of the pinion gears;
a common shaft connecting the two pinion gears and the intermediate gear;
a driving gear; and
a motor connected to the driving gear,
wherein the motor is disposed adjacent to one side of the truck box.

19. The tonneau cover assembly of claim 12, further comprising a plurality of seals mounted between adjacent slats and extending along the transverse direction to connect the slats.

20. The tonneau cover assembly of claim 18, wherein the end cap includes two teeth at a middle portion and two half teeth at edges, wherein one half teeth at an edge from an end cap and one half teeth at an edge from an adjacent cap form one teeth, and wherein the teeth from the end caps collectively form a rack for an engagement with the two pinion gears.

* * * * *